United States Patent [19]

Purdy et al.

[11] Patent Number: 4,499,516
[45] Date of Patent: Feb. 12, 1985

[54] CLEANING DISK WITH OPAQUE RING

[75] Inventors: Richard T. Purdy, Inglewood; Alden H. Packard, Glendora, both of Calif.

[73] Assignee: Perfect Data Corporation, Chatsworth, Calif.

[21] Appl. No.: 346,557

[22] Filed: Feb. 8, 1982

[51] Int. Cl.³ .......................... G11B 5/41; G11B 3/58; G11B 23/50

[52] U.S. Cl. ..................... 360/128; 360/99; 360/133; 360/137

[58] Field of Search ............... 360/128, 99, 74.6, 74.5, 360/74.1, 137, 97, 98, 133, 86; 206/444; 15/210 R

[56] References Cited

U.S. PATENT DOCUMENTS

| | | | |
|---|---|---|---|
| 3,596,006 | 7/1971 | Lahon | 360/74.6 |
| 3,614,453 | 10/1971 | Johnson | 360/74.6 |
| 4,065,798 | 12/1977 | Sugisaki | 360/128 |
| 4,106,067 | 8/1978 | Masuyama | 360/137 |
| 4,180,840 | 12/1979 | Allan | 360/128 |
| 4,374,404 | 2/1983 | Davis | 360/99 |
| 4,375,658 | 3/1983 | Martinelli | 360/86 |

*Primary Examiner*—Robert Martin Kilgore
*Attorney, Agent, or Firm*—Spensley, Horn, Jubas & Lubitz

[57] ABSTRACT

A cleaning disk made of a thin fibrous material is provided with an opaque ring so that the cleaning disk will look like magnetic media to the sensors of a flexible disk system. The opaque ring may be in the form of a separate plastic ring which is bonded to the cleaning disk and extends to the center opening of the disk. Such a structure provides the requisite opaque area as well as providing reinforcement to the central area of the cleaning disk.

18 Claims, 3 Drawing Figures

CLEANING DISK WITH OPAQUE RING

BACKGROUND OF THE INVENTION

1. Field of the Invention

This invention relates to cleaning disks used to clean the magnetic heads in flexible disk systems. More particularly, this invention relates to cleaning disk systems which utilize thin, fibrous cleaning disks in combination with a cleaning solution to provide a wet cleaning system for the magnetic heads in a flexible disk system.

2. Description of the Prior Art

In order to achieve optimum performance and minimize maintenance requirements, it is desirable to periodically clean the magnetic heads of flexible disk systems. Unlike other peripheral devices, the magnetic heads on flexible disk drives are extremely difficult to access without partially disassembling the drive system. Due to this difficulty, head cleaning is generally done only when read/write problems are being experienced.

Several systems have been developed in an attempt to provide a convenient means of cleaning the head(s) on flexible disk systems. One such system utilizes two flexible disk jackets. One of the jackets contains an abrasive lapping material, and the other contains a cleaning cloth material. The first jacket is inserted into the flexible disk system and run through the machine for a predetermined amount of time (generally no longer than 10 seconds in order to avoid damage to the magnetic head from the abrasive material) so as to loosen debris from the head. The second jacket is then run through the machine so as to pick up the loosened debris. The jackets include standard size openings (i.e., thin radial slots) in order to allow the heads to contact the cleaning material.

A second system, described in IBM Technical Disclosure Bulletin, Volume 20, No. 8, January 1978, utilizes a standard flexible disk jacket and substitutes an abrasive disk for the normal magnetic disk. The abrasive disk is coated with either chromic oxide or aluminum oxide. The assembly is used to initially lap the magnetic heads of flexible disk drives and subsequently remove contaminant build up on the heads.

A third system for cleaning magnetic heads is disclosed in U.S. Pat. No. 4,065,798 to Sugisaki et al. This system includes a laminated disk which has a flexible nonmagnetic support (e.g., polyvinyl cloride) coated with a magnetic layer on one side and a fibrous cleaning material on the other side. The cleaning disk is located within a cartridge which contains a lubricating layer surfacing the magnetic layer of the cleaning disk, and includes a normal radial slit which allows the magnetic head to contact the fibrous cleaning material.

Another system is disclosed in U.S. Pat. No. 4,180,840 to Allan. This system also includes a laminated disk having an abrasive material on one side and a smooth surface on the other. U.S. Pat. No. 4,106,067 to Masuyama et al also discloses a laminated cleaning disk.

Recently, a cleaning system has been developed which employs a nonabrasive cleaning disk made of an absorbent and porous material. The cleaning disk is typically quite thin (less than about 0.015 inches) and has a light color. The disk is carried within a jacket and is either partially or wholly saturated with a cleaning fluid. The jacket is inserted into a flexible disk system and the cleaning disk is rotated while in contact with the magnetic heads of the system. Such a system is disclosed in U.S. patent application No. 20,808 to Davis et al, filed Mar. 15, 1979, and in corresponding United Kingdom patent application publication No. 2,045,508, published Oct. 29, 1980, both of which are assigned to the same assignee as the present application.

Both magnetic media (i.e., "floppy disks") and most cleaning disks are opaque. The media or cleaning disk, as well as the jacket, contains one or more index holes. The flexible disk system includes a light source on one side of the jacket and a photodetector on the opposite side of the jacket. Normally, the opaque media or cleaning disk will interrupt light from the light source, thereby preventing the photodetector from being energized. However, as the media or cleaning disk rotates, the index hole will coincide with the path of the light source, thereby enabling the beam to strike the photodetector. The photodetector detects the transition in the amount of light received and generates a signal which signifies that a disk is in place within the system. The receipt of such a signal enables the magnetic heads to move into contact with the magnetic media or cleaning disk. As long as a transition signal is detected periodically, the head will remain engaged.

Due to the thinness and fibrous structure of the above-described Davis system, a substantial portion of light from the light source may pass through the cleaning disk, with the result being that the photodetector will not detect transitions in the amount of light received from the light source. If this occurs, the magnetic heads will be prevented from moving into contact with the cleaning disk and cleaning cannot be accomplished.

SUMMARY OF THE INVENTION

Accordingly, it is an object of the present invention to provide a means of insuring that the magnetic heads will be moved into contact with the cleaning disk when the disk is inserted into a flexible disk system. In this regard, it is an object of the present invention to make a cleaning disk "look like" magnetic media when it is inserted into a flexible disk system.

These and other objectives are accomplished by providing an opaque area on the fibrous cleaning disk which prevents light from passing through the disk to the photodetector. The disk includes an opening in the opaque area which enables light to pass and trigger the photodetector system. The opaque area may be in the form of a ring which is printed onto the cleaning disk, or it may be a separate piece of material which is secured to the disk. When separate material is utilized, it can also be employed to provide reenforcement to the disk in the area where it is contacted by the disk drive system. The reinforcement aids in positioning the cleaning disk, reduces wear on the disk and assures more positive gripping between the drive hub and cleaning disk.

BRIEF DESCRIPTION OF THE DRAWING

The invention will now be described with reference to the accompanying drawings, wherein.

DESCRIPTION OF THE PREFERRED EMBODIMENT

The following description is of the best presently contemplated mode of carrying out the invention. This description is made for the purpose of illustration and should not be taken in a limiting sense, since the scope of the invention is best defined by the appended claims.

Figure 1:
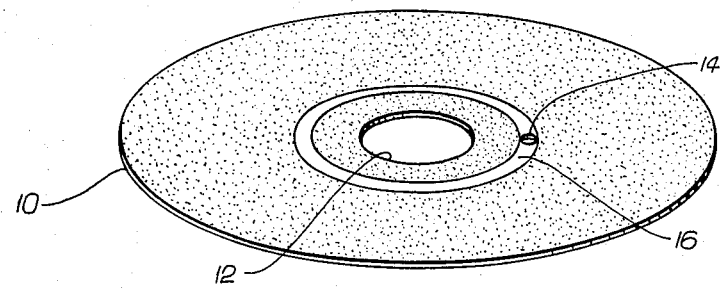
FIG. 1 is a top plan view of a cleaning disk having an integral ring formed thereon.

Referring to FIG. 1, a cleaning disk 10 is made of an absorbent and porous fibrous material. In use, the cleaning disk 10 is rotatably supported within a jacket (not shown). The cleaning disk is lint-free and will pick up contaminants and debris from the head(s) of a flexible disk system as it is rotated. Typically, the disk 10 is made from a fibrous material having a white or other light color material so that an operator may easily tell when the disk needs replacement by checking it for discoloration. Materials which may be used for the disk 10 include spun-bonded polyester (e.g., Dupont Reemay). Typically, the cleaning disk will have a thickness of about 0.015 inches or less.

The disk 10 includes a central opening 12 for accommodating a drive shaft hub of a disk drive system. In addition, the disk has at least one small opening 14 formed near the center opening 12 which operates in conjunction with the photoelectric system of a disk drive unit. As the disk 10 is rotated by the drive unit, light from the photodetector system will periodically pass through the opening 14. A photodetector will detect the transition in the amount of light received and provide signals which indicate that the disk is in position within the flexible disk system. These detection signals enable the head(s) of the system to move into contact with the cleaning disk. If the transitions are not detected, the head(s) will be prevented from moving into contact with the cleaning disk. In addition, after the head(s) move into contact with the disk, transitions must be periodically detected in order for the head(s) to remain engaged.

In order to insure that light from the light source of the photodetector system will be blocked by the cleaning disk 10, an opaque ring 16 is formed on the disk at a distance from the center of the disk equal to the distance of the hole 14 from the center of the disk. The ring is preferrably black or other dark color and may be formed by applying ink onto the disk 10. This is preferrably accomplished by means of a silk screening process although other methods may be employed. The presence of the ring 16 enables the cleaning disk to "look like" magnetic media to the sensors of the flexible disk system.

In operation, the cleaning disk 10 is typically partially or completely saturated with a cleaning fluid. One fluid which is utilized is a combination of isopropyl alcohol and freon. The ink which is used to form the ring 16 must therefore be of a type which will not be chemically attacked by the cleaning solution. Epoxy based inks generally will fulfill this requirement.

Figure 2:
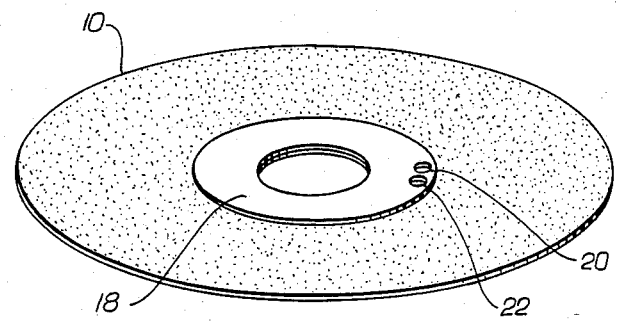
FIG. 2 is a top plan view of a cleaning disk having a ring of opaque material bonded thereto.

FIG. 2 shows an alternative embodiment of the invention in which a separate opaque ring 18 is bonded to the cleaning disk 10. This ring may be made of a thin opaque plastic film (e.g., Dupont Mylar) having an adhesive substrate which is not chemically affected by the cleaning solution. Heat bonding adhesive materials are preferred. Adhesives activated by ultrasonic and radio frequency bonding techniques may also be used. The ring 18 should be of a thickness which will not interfere with the basic operation of the cleaning disk, i.e., it will not substantially reduce the flexiblity of the noncovered portion of the disk. Rings having a thickness of approximately 1-4 mils have proven to be successful; however, the thickness of the ring is not critical.

The cleaning disk in FIG. 2 is shown to include a pair of indexing holes 20 and 22. Although a single indexing hole should provide satisfactory operation, it has been discovered that certain types of disk drives, particularly drives generally referred to as "hard sector drives" require two closely spaced signals per disk revolution for proper operation. The heads will not lower into contact with the cleaning disk until the second signal is received. Thereafter, the heads will remain in contact with the cleaning disk as long as signals are generated at specified intervals.

Figure 3:
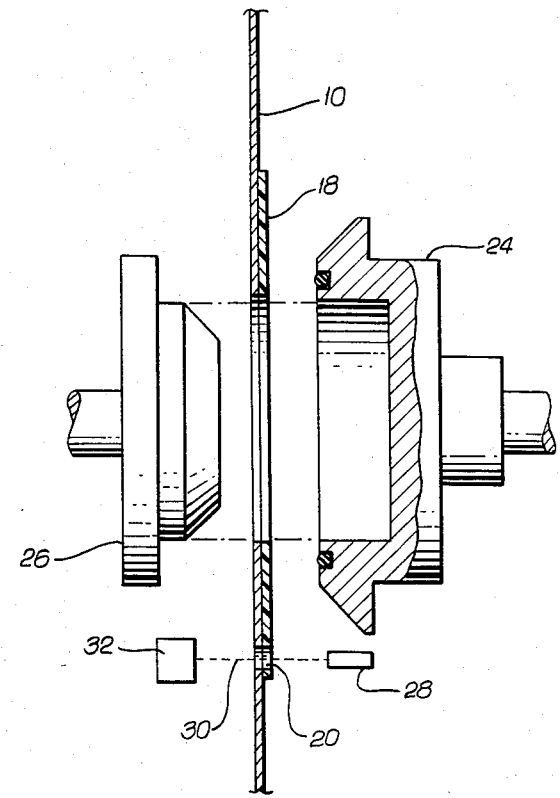
FIG. 3 is a sectional view showning the cleaning disk of FIG. 2 in position adjacent the drive unit of a flexible disk system.

Referring to FIG. 3, the ring 18 provides the added advantage of reinforcing the center area of the cleaning disk 10. The drive unit of a flexible disk system typically includes a spindle 24 and a clutch 26. A light source 28 generates a light beam 30 toward a photodetector 32. To drive the cleaning disk 10, the clutch and spindle are moved together to clamp the disk. The ring 18 provides reinforcement to the center area of the cleaning disk 10 which aids in the positioning of the disk with respect to the clutch and spindle. The addition of a ring 18 which extends all the way to the center 12 of the disk provides an extra degree of rigidity which enables the disk 10 to function more like magnetic media.

Normally, the light beam 30 will be blocked by the opaque ring 18. As the cleaning disk 10 rotates, an opening 20 (or 22) will align with the beam 30, allowing the beam to pass through the cleaning disk and strike the photodetector 32. The detection of the transition in light received by the detector 32 enables the heads of the flexible disk system to move into contact with the cleaning disk 10.

Thus, the use of a separate opaque ring bonded to the cleaning disk and extending to the central opening of the disk provides both the required opaque area and reinforces the center of the disk. Furthermore, it is typically less expensive to provide a separate opaque ring 18 than it is to print a ring onto the disk such as in FIG. 1.

It should be noted that the sensor system of most flexible disk systems operates by detecting transitions in light received. Therefore, a cleaning disk could be implemented by forming an opaque dot on the disk instead of a ring. The cleaning disk would be substantially transparent, and light from the light source 28 would be blocked only when the dot crossed its path. Of course, the use of a dot as opposed to a ring would not provide any type of reinforcing function.

In summary, the present invention facilitates proper loading of magnetic heads against a cleaning disk by providing a structure which enables the cleaning disk to "look like" magnetic media to the sensor of a flexible disk system. This is accomplished by the addition of an opaque ring to the cleaning disk to insure that light will not pass through it.

I claim:

1. A cleaning disk for cleaning magnetic heads in a flexible disk system, wherein the flexible disk system incldues a light source and light sensor for detecting the presence of a disk therein, said cleaning disk comprising:

a disk made of an absorbant and porous material and having a central opening through which the drive unit of the flexible disk system passes, said disk further including a sensing area which selectively prevents light from the light source from striking the light sensor, said sensing area including a first section of substantially opaque material applied to the disk in the form of a ring located near the central opening and a second section which is substantially transparent formed in the disk and located in the ring, wherein the flexible disk system rotates the cleaning disk to alternatly bring the first and second section in a position between the light source and light sensor.

2. The cleaning disk of claim 1 wherein the first section comprises an ink ring which is applied to the disk.

3. The cleaning disk of claim 2 wherein the second section comprises one or more holes in the disk located in the ink ring.

4. The cleaning disk of claim 2 wherein the disk is adapted to be saturated with a cleaning solution, wherein the ink is impervious to chemical action by the cleaning solution.

5. The cleaning disk of claim 4 wherein the ink is an epoxy based ink.

6. The cleaning disk of claim 1 wherein the first section comprises a ring of thin opaque material which is bonded to the disk.

7. The cleaning disk of claim 6 wherein the second section comprises one or more holes which pass through the disk and the opaque material.

8. The cleaning disk of claim 7 wherein the opaque material is a plastic film.

9. The cleaning disk of claim 6 or 8 wherein the ring extends to the central opening to provide reinforcement to the disk in the area of the central opening.

10. The cleaning disk of claim 6 wherein the disk is adapted to be saturated with a cleaning fluid, wherein the ring is bonded to the disk with an adhesive and wherein the ring and adhesive are impervious to chemical action by the cleaning solution.

11. A cleaning disk for use with flexible disk systems comprising:
a disk made of fibrous material and adapted to be saturated with a cleaning solution, said disk including a central opening, said disk further including a ring shaped area near the central opening, said ring shaped area including a first section comprised of an opaque material applied to the disk and a second section comprised of a light transmitting area.

12. The cleaning disk of claim 11 wherein the first section comprises substantially the entire ring shaped area.

13. The cleaning disk of claim 12 wherein the second section comprises one or more holes formed in the disk in the ring shaped area.

14. The cleaning disk of claims 12 or 13 wherein the first section is comprised of ink applied to the cleaning disk.

15. The cleaning disk of claims 12 or 13 wherein the ring shaped area is comprised of a ring of opaque material bonded to the disk and wherein the second section is comprised of one or more holes in the opaque material.

16. The cleaning disk of claim 15 wherein the opaque material is a plastic film.

17. The cleaning disk of claim 16 wherein the plastic film extends to the central opening to thereby reinforce the disk.

18. A cleaning disk for cleaning a reading and writing transducef of a floppy disk drive comprising:
a circularly-shaped disk of fibrous material, the disk having a circular central aperture formed therethrough for engagement a spindle of a floppy disk drive, the disk drive having a sensing aperture formed therethrough for permitting a floppy disk drive to sense the presence of the cleaning disk when the cleaning disk is inserted into a floppy disk drive, the disk further including an annular region centered about said central aperture, said annular region including said sensing aperture and opaque material.

* * * * *